United States Patent Office 3,108,899
Patented Oct. 29, 1963

3,108,899
OPAQUE COATED PLASTIC SHEET MATERIAL
Harold J. Reindl and Melvin V. Roode, Dayton, Ohio, assignors to General Motors Corporation, Detroit, Mich., a corporation of Delaware
No Drawing. Filed May 19, 1960, Ser. No. 30,073
3 Claims. (Cl. 117—76)

This invention relates to a coated plastic material and a method of making the same.

One of the objects of the invention is to provide a formable resin base comprising a polyvinyl chloride, styrene acrylonitrile, butadiene acrylonitrile composition which has flexibility and is extrudable and to coat said composition with a thin, coextensive coating fully compatible therewith wherein the coated material may be subsequently formed with the base to provide a desired article without disrupting the coating which, due to its coextensive and compatible nature, forms with the base material.

In carrying out the above object, it is a further object to re-use the trimmings from the formed material whereby the coating, being opaque, creates uniformity in the finished product.

Further objects and advantages of the present invention will be apparent from the following description wherein preferred embodiments of the present invention are clearly shown.

In the manufacture of plastic sheet material capable of heat forming, for example, it has always been prior practice to pigment the material and then sheet the same on rolls prior to forming. The forming step is frequently carried out under vacuum conditions whereby faithful representation of the desired shape is obtained. After the forming operation, the article is trimmed and the trimmings are re-used by again milling and sheeting the same. It is apparent that the trimmings must be added only to stock of the same color since any different coloring would cause a deviation in the final color of the sheeted stock.

This condition has occasioned high production costs due to the fact that, in the manufacture of crash pad coverings, for example, for use in automobiles, six to eight basic colors are used and, therefore, a like number of trim bins must be maintained wherein the trimmings from each color can only be used when additional sheet stock is being made of the same color. This creates considerable expense and frequently high loss when colors are discontinued.

The present invention is directed to a material which overcomes these past difficulties and wherein, for light colors, a neutral shade of sheet material is formed. Furthermore, this sheet material, rather than being produced on calender rolls, is extruded directly from an extruder into the desired thickness. The sheet material is then sprayed with a compatible coating of a paint which includes most of the basic plastic elements of the sheet so that a coextensive formable covering is obtained which is opaque whereby the desired color is produced. The sheet is then formed over a vacuum forming buck or other suitable equipment and the excess material is trimmed therefrom. This excess sheet material, due to the extreme thinness of the color coating, may then be thrown back into a common scrap bin and re-used through the extruder in admixture with other scrap material including different colors together with substantial portions of the virgin material. The contamination of color is relatively slight and is not of any great importance since, in subsequent color coating operations, the opaque resin paint completely covers and obscures the base material.

It is understood that, where light-colored paints are to be used, it is preferable to use a rather neutral shade of base whereas, where dark color paints are being used, a darker base is preferred so that a thinner coating may be used. However, these are variables which may be chosen at will and are not of any great importance other than to facilitate the operation since, in all cases, the coating paint is opaque and suitable thicknesses thereof may be applied to produce any desired effect.

Specifically, the base stock used is a polyvinyl chloride-styrene acrylonitrile-butadiene acrylonitrile combination wherein a preferred embodiment is disclosed in Example 1:

[All percentages by weight]

|  | Ex. 1 | Ex. 2 | Ex. 3 | Ex. 4 | Ex. 5 | Ex. 6 | Ex. 7 |
|---|---|---|---|---|---|---|---|
| PVC Resin | 26.49 | 15 | 30 | 26 | 26 | 26 | 26 |
| Styrene Acrylonitrile Resin | 33.11 | 33 | 33 | 25 | 40 | 33 | 33 |
| Buna N Rubber | 24.64 | 25 | 25 | 25 | 25 | 15 | 36 |
| Stabilizer | 1.78 | 1–3 | 2 | 2 | 2 | 2 | 2 |
| Plasticizer | 11.39 | 22 | 7 | 19 | 4 | 21 | 0 |
| Antioxidant | 1.33 | 0–3 | 1.5 | 1.5 | 1.5 | 1.5 | 1.5 |
| Pigment | 1.26 | 0–5 | 1.5 | 1.5 | 1.5 | 1.5 | 1.5 |
| Hardness | Shore A Durometer 92–94. | Softer | Harder | Softer | Harder | Slightly Softer. | Slightly Softer. |

In these recipes, the PVC resin is a polyvinyl chloride resin having a specific viscosity of .37 and sold under the trade name of "Marvinol VR–33."

The styrene acrylonitrile is a mixture containing between 27.2% and 28.5% by weight of acrylonitrile with the remainder styrene.

The butadiene acrylonitrile elastomer (Buna N) contains 68% by weight butadiene with the remainder being acrylonitrile.

In the preferred embodiment, the stabilizer is dibasic lead phosphite, the plasticizer—dioctyl azelate and an optional plasticizer is an epoxidized soybean oil sold under the trade name "Plastolein 3051–S." The antioxidant is styrenated phenol sold as "Agerite Spar." In place of these materials, the stabilizer may be dibasic lead phthalate, the plasticizer dioctyl sebacate or N-octyl, N-decyl phthalate while the antioxidant may be a mixture of substituted phenols sold under the trade name of "Wingstay S."

It will be seen that the plasticizer, antioxidant and pigment are optional, varying from 0 to defined percentages. The use of these materials is preferred but not essential. The stabilizer may be varied as is well known in the art. Also, small quantities of stearic acid ranging about .15% by weight ±50% thereof may be added if desired as a softener to improve processing.

The important ingredients are, therefore, the three resins, namely, the PVC, styrene acrylonitrile and butadiene acrylonitrile (Buna N). These may be varied within the ranges noted for varying physical properties. In this connection, a terpolymer of styrene, acrylonitrile and butadiene may be used in place of the styrene acrylonitrile if properly balanced to give the same monomer ratios in the compound. Also, the terpolymer may be substituted for the butadiene acrylonitrile. Here, too, the monomer ratios in the total mix should be held to the preferred ratios.

These materials may be mixed in a Banbury or on a two-roll rubber mill at temperatures in the order of 280° F. to 300° F. If mixed in a Banbury, the material should be subsequently sheeted out and then the sheets should be granulated at a temperature of about 155° F. to 170° F. It is now ready for use in a standard extruder wherein the sheet material is formed.

Trim stock from previously-formed sheet may be treated in a like manner, namely, refluxed in a Banbury or on a rubber mill and granulated at the same temperatures as previously mentioned. The scrap should be added to virgin stock in preferred percentages of from 5% to 25% thereof although we have found that, using the scrap in percentages as high as 50%, has not caused any great difficulty. It is apparent that other methods, such as direct granulating of the trim stock, may be used if desired although we have found that the above-noted procedures are easier to perform and result in greater uniformity of product.

The physical characteristics of the sheet material are not changed markedly by the addition of the scrap thereto. The original compound, as manufactured from recipe #1, has the following physicals:

| Shore A | 100% Modulus, p.s.i. | Tensile, p.s.i. | Elongation, percent | Crescent Tear, lbs./in. |
| --- | --- | --- | --- | --- |
| 92 | 1,838 | 2,000 | 335 | 475 |

A compound utilizing 25% scrap mixed therewith has the following physicals:

| Shore A | 100% Modulus, p.s.i. | Tensile, p.s.i. | Elongation, percent | Crescent, lbs./in. |
| --- | --- | --- | --- | --- |
| 93 | 1,800 | 2,000 | 355 | 424 |

It will be noted by comparison of these figures that the physical characteristics are not changed significantly and are substantially similar to those of the virgin stock.

The painting of the sheet stock prior to forming may be carried out with a vinyl-acrylic ester type of paint. A preferred mixture of plastic materials for the paint is as follows:

|   | Percent |
| --- | --- |
| Acrylic ester resin | 32 |
| PVC resin (polyvinyl chloride) | 61.82 |
| Vinyl acetate resin | 6.18 |

This mixture may include an epoxy type stabilizer added thereto, for example, ½% by weight together with any pigment desired in sufficient quantity to produce the desired color. The solid ingredients are dissolved in a suitable solvent such as toluene, xylene, benzene, etc. A suitable paint for spraying may be made by mixing 16 parts of the resin mixture with 55 to 65 parts by weight of the solvent. Since the acrylic ester resin does not dissolve as readily as the other two resins, it is preferred to use a portion of the solvent to form about a 40% solids solution therewith prior to the addition of the remaining resins, solvent and pigment, etc.

The proportions of the three resins used in the paint may be varied within limits. For example, the acrylic acid resin may range between 20% and 44%, the PVC resin between 50% and 70% and the vinyl acetate resin from 5% to 20%. When the resins are varied, the paint will have slightly different physical properties but will remain compatible with the base material and can be formed therewith without cracking or rupturing the coextensivity of the film.

In the above recipe and description, the PVC resin is the polyvinyl chloride also noted in Example 1. The acrylic ester resin is polymethyl methacrylate sold by Rohm and Haas as "A-101."

It is also apparent that the amount of solvent may vary widely in accordance with the desired covering power of the paint and the thickness of paint desired. For example, the percent of solvent may be increased if two coats are applied to the base material. Likewise, the solvent percentage may be decreased if the material is carefully applied so that a relatively thin film, within the limits noted hereinafter, are maintained. Likewise, the percentage of pigment may vary in accordance with the color being used and the specific pigment. All of these variations are well known to those skilled in the art.

It is also to be understood that, where a base material which has a desired color is used, the coating may be clear and, in this instance, the pigment is left out.

All the resins used in the formula are of the thermoplastic type and the coating is a lacquer which may be either air dried or force dried by application of heat. Further, the coating may be redissolved in the same solvents and re-used without changing essentially the characteristics thereof.

Specifically, the coating lacquer may be applied by spraying, roller coating, brushing or any suitable means directly on the extruded, sheeted-out base material. It is preferable that two coats be applied wherein the first coat is a color coat with a thickness of approximately .0005 inch which may be dried under heat at around 175° F. for about two and one-half minutes and, thereafter, a clear coat of unpigmented, lacquer is applied directly thereto by similar methods to a dry film thickness of approximately .0002 inch. Again, a force drying step at 175° F. for two minutes is used. After this coating operation, the sheet is air cooled to room temperature and may then be placed in a vacuum-forming apparatus and formed wherein the over-all thickness of the skin may be reduced as much as 75% during the reduction in thickness of the base material. This is one of the basic features of this invention wherein, due to the complete compatibility and coextensive bond between the lacquer layer and the base layer, the two act as a unit and the skin or coating layer stretches coextensively with the base material without breaking. The film thicknesses for the coating may vary from ¼ mil to 2 mils and, preferably should be about .0007 inch when used on .035 base material wherein the film accounts for approximately 2% of the total thickness of the colored sheet.

The present invention eliminates many of the past difficulties experienced in the manufacture of these formed sheet materials and may be used in many applications in automotive work. The heat forming may be carried out under vacuum conditions as suggested in Blair Patent 2,032,832, Vacuum Forming Apparatus, as is well known in the art or by any other well-known heat forming process with or without vacuum or pressure. The material described has reduced the cost of manufacture and also has reduced the problems of large scale production activities while in no way reducing the quality of the product. The use of extruded sheet stock permits production of sheet material of predetermined width which improves production procedures in that the sheet material may be run directly under a punch wherein sheets of the desired shape and size are progressively produced. This presents considerable savings over materials made on rolls wherein separate small size sheets must be used and wherein the scrap is sometimes equal to the amount of material used in the finished piece, necessitating considerable re-working of the material during production procedures.

In general, the invention as disclosed herein improves production in procedures while reducing the cost of the operations and eliminating many of the more tedious operations which heretofore have been necessary in order to produce satisfactory, formed sheet material.

One of the major advantages of the procedure is to reduce the time and effort required to change colors with model changes, for example. In the present instance, it is merely necessary to obtain a paint or lacquer which will match the color of the upholstery and/or body paint and this may be accomplished for an entire line in a very short period of time. On the other hand, following the old procedures where the plastic per se has to be pigmented, it required many weeks of matching in order to obtain stable colors. One of the most difficult phases of this matching procedure is due to the fact that the colors in the uncured state and the colors in the cured state are different and, therefore, considerable time was spent in order to obtain a reasonable match. All of these time-consuming processes are eliminated by following the techniques described herein.

While the embodiments of the present invention as herein disclosed constitute preferred forms, it is to be understood that other forms might be adopted.

What is claimed is as follows:

1. A heat formable composite sheet, consisting essentially of, a base layer made from a compounded mixture of polyvinyl chloride resin comprising 15 to 30% by weight of the base layer, styrene acrylonitrile resin comprising 25 to 40% by weight of the base layer and butadiene acrylonitrile elastomer comprising 15 to 36% by weight of the base layer; so as to yield a heat deformable sheet, and a coextensive, relatively thin, compatible opaque cover layer thereover and bonded thereto in a thickness of about 2% of the overall thickness of the sheet and consisting essentially of a mixture of polyvinyl chloride comprising 50 to 70% by weight of said mixture, polymethyl methacrylate comprising 20 to 40% by weight of said mixture and vinyl acetate comprising 5 to 20% by weight of said mixture.

2. A heat formable composite sheet, consisting essentially of, a base layer made from a compounded mixture of polyvinyl chloride resin comprising 15 to 30% by weight of the base layer, styrene acrylonitrile resin comprising 25 to 40% by weight of the base layer and butadiene acrylonitrile elastomer 15 to 36% so as to yield a heat deformable sheet, and a coextensive, relatively thin, opaque compatible cover layer thereover and bonded thereto consisting essentially of a stratum comprising a pigmented mixture of polyvinyl chloride comprising 50 to 70% by weight of said mixture, polymethyl methacrylate comprising 20 to 40% by weight of said mixture and vinyl acetate comprising 5 to 20% by weight of said mixture, and a second stratum consisting of a coextensive clear coating over the first stratum of the same three major ingredients and in the same proportions, said cover layer being approximately 2% of the total thickness of the sheet.

3. A laminate of heat formable material, comprising, first and second layers coextensively bonded at their juxtaposed surfaces, the first layer consisting essentially of, a compounded mixture of polyinvyl chloride resin, styrene acrylonitrile resin and butadiene acrylonitrile elastomer wherein the polyvinyl chloride resin makes up 26.49% by weight of the mixture, the styrene acrylonitrile resin 33.11% by weight of the mixture and the butadiene acrylonitrile elastomer 24.64% by weight of the mixture, the remainder being stabilizers, plasticizers, anti-oxidants and pigments; said layer having a Shore A hardness in the range of 92 to 94, said second layer making up about 2% of the thickness of the laminate and consisting of a mixture of polymethyl methacrylate 32% by weight, polyvinyl chloride 61.82% by weight and vinyl acetate resin 6.18% by weight.

References Cited in the file of this patent

UNITED STATES PATENTS

| | | |
|---|---|---|
| 2,123,474 | Redman | July 12, 1938 |
| 2,311,249 | Powell | Feb. 16, 1943 |
| 2,520,919 | Forgie | Sept. 5, 1950 |
| 2,617,750 | Le Clair et al. | Nov. 11, 1952 |
| 2,808,387 | Parks et al. | Oct. 1, 1957 |
| 2,924,545 | Daly | Feb. 9, 1960 |